UNITED STATES PATENT OFFICE.

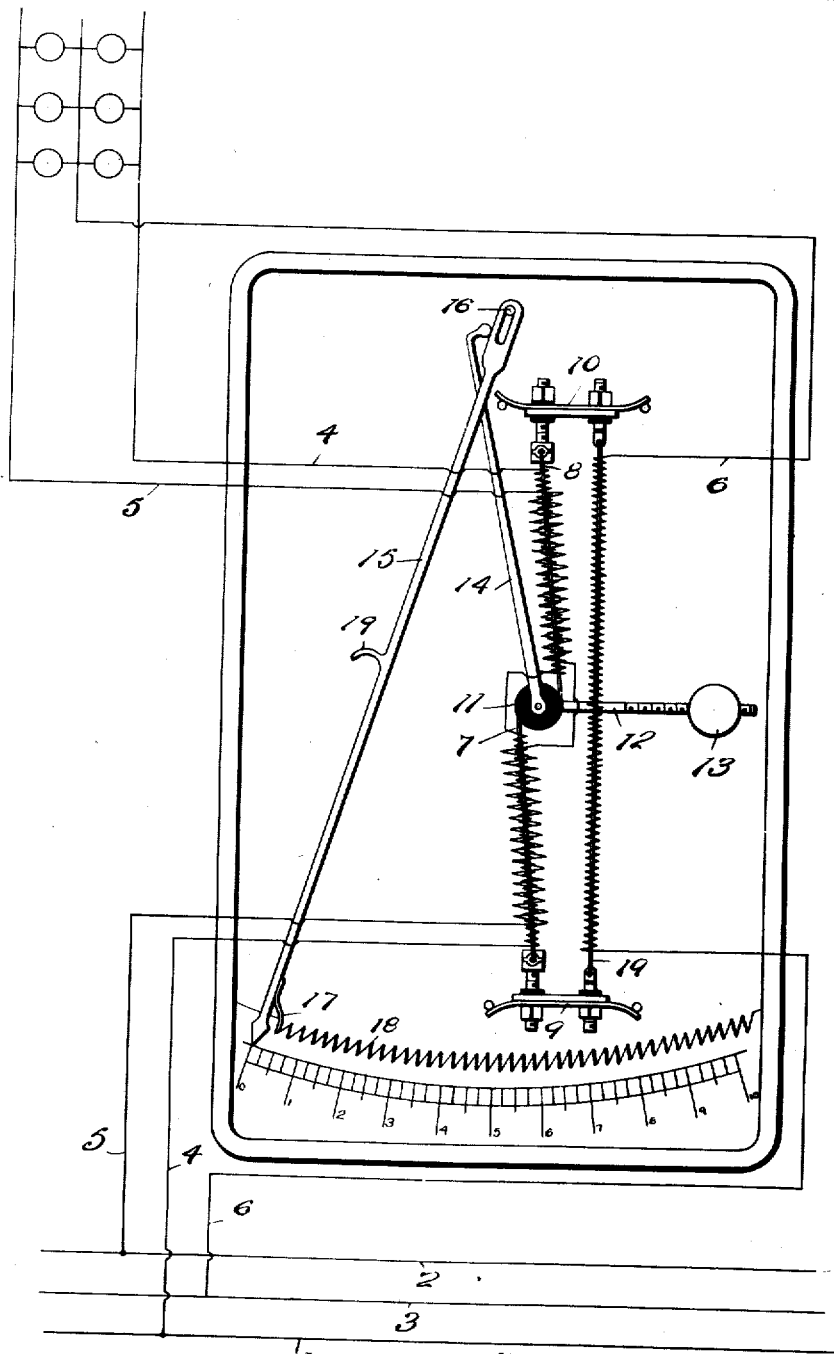

MAURICE J. WOHL, OF NEW YORK, AND HARRY HERTZBERG, OF BROOKLYN, NEW YORK, ASSIGNORS TO ABBOT A. LOW, OF HORSESHOE, NEW YORK, MAURICE J. WOHL, OF NEW YORK, N. Y., AND HARRY HERTZBERG, OF BROOKLYN, NEW YORK, TRUSTEES.

ELECTRICAL MEASURING INSTRUMENT.

947,267.        Specification of Letters Patent.       Patented Jan. 25, 1910.

Application filed March 31, 1908. Serial No. 424,325.

*To all whom it may concern:*

Be it known that we, MAURICE J. WOHL and HARRY HERTZBERG, citizens of the United States, and residents, respectively, of the city of New York, borough of Manhattan, county and State of New York, and of the city of New York, borough of Brooklyn, county of Kings, and State of New York, have invented certain new and useful Improvements in Electrical Measuring Instruments, of which the following is a specification.

This invention relates to electrical measuring instruments and more particularly to an instrument adapted to indicate the maximum electrical energy flowing in any multi-circuit system.

The object sought to be obtained is to provide a simple device of this character which may be embodied in a single instrument adapted to be used with a multi-circuit system, with especial reference to the ordinary three-wire system of distributing now in use.

In devices of this nature it is desirous to obtain a record of the maximum current which flows in a circuit for an appreciable time. This has been found to be a comparatively simple matter in an ordinary two-wire circuit, but in three-wire or other multi-circuit systems it has been difficult to obtain directly a correct record of the maximum current. Among the methods which have been used is that of using two separate instruments, but this method, it will be readily understood, does not give a correct result as the two sides of the circuit are seldom balanced, that is, using the same amount of current, and consequently, the maximum current consumption is seldom correctly indicated by the combined readings of the two instruments.

In some of its features the device herein shown and described is similar to that shown in our co-pending application filed Mch. 20, 1908, under Ser. No. 422,275. The distinguishing features will be more fully described hereinafter.

In the drawing is shown, a semi-diagrammatic view of an instrument embodying our invention used in connection with an ordinary three-wire system.

The two outside wires or mains of the system are shown at 1 and 2 and the neutral wire at 3. Extending from these are the auxiliary leads 4, 5 and 6 which supply the current to lamps or other current consuming apparatus, which is indicated diagrammatically in the drawing.

In the instrument shown in the drawing 7 and 8 are two thermally expansible wires which are supported at their outer ends by means of yielding spring supports 9 and 10, respectively. At their inner ends the wires 7 and 8 are connected to a rotatable member 11 to which is also attached an arm 12 which carries an adjustable weight 13 which tends to preserve the wires 7 and 8 under tension. The arm 14 is also attached to the rotatable member 11 and so positioned as to engage an indicator 15 which is pivotally mounted at 16 by means of an elongated opening permitting longitudinal movement thereof.

At the lower end of the indicator is an engaging member 17 which travels over a graduated index plate provided with an arcuate serrated edge. These serrations are preferably provided with an inclined surface on one side and a radial surface on the other side permitting the indicator 15 and its engaging member 17 to be moved over the same in one direction only. A suitable handle 19 may be provided on the indicator 15 by means of which the same is raised so that the engaging member 17 is out of engagement with the serrations and the indicator may be swung back to its initial position.

Surrounding the thermally expansible members 7 and 8 are two separate heating coils insulated from each other and the wires 7 and 8. These coils are connected in series respectively with the leads 4 and 5 of the supply circuit and when the current flows in either one or both of these leads the heating coils cause the thermally expansible wires 7 and 8 to expand, allowing the weight 13 to rotate the member 11, which in turn causes the arm 14 to engage the indicator 15 and swing the same about its pivot over the index plate. When the current is reduced or cut out entirely the wires 7 and 8 resume their normal temperature and in cooling and contracting rotate the member 11 and its attached parts to their original position.

It is not necessary to describe herein the operation of a three wire system and it will be seen that if the current consumption at both sides of the system, that is, between the leads 4 and 6 and between the leads 5 and 6 should be the same, the construction just described would be sufficient to indicate the maximum current, but as this condition seldom exists in actual practice it becomes necessary to provide for correcting the reading under other conditions. To accomplish this result a compensating thermally expansible wire 19 is provided. This wire is attached at its upper and lower ends to the spring supports 9 and 10 and is supported by a heating coil connected in series with the auxiliary lead 6 from the neutral wire. The resistance of this last named heating coil is one-half of that of either of the coils surrounding the wires 7 and 8 and, consequently, the heating effect is one-half for the same amount of current.

The action of the heating coil in the neutral circuit 6 is to cause the compensating wire 19 to expand, allowing the spring supports 9 and 10 to take up a part of the expansion of the wires 7 and 8 thus partly neutralizing the combined effect of the heating coils in series with the leads 4 and 5. The combined effect of these heating coils with the construction described will be found to be constant regardless of whether the current consuming devices are the same on either side of the circuit or not and this result may be expressed by the formula $X^2+Y^2-(Z^2 \div 2)$; in which X is the current on one outside line; Y is the current on the other outside line and Z is the current in the neutral line, the element of resistance being omitted as it is common to each. From this it will be seen that the total expansion will vary as $\frac{1}{2}(X+Y)^2$.

The compensating wire 19 has an additional function in providing for changes of temperature in the surrounding air which would ordinarily cause the wires 7 and 8 to expand or contract and so move the indicator. By making this compensating wire 19 so that it will have the same expansion or contraction for a given change of temperature as wires 7 and 8, it will be seen that under these conditions the spring supports 9 and 10 will be moved and any rotative movement of the member 11 will be prevented. It will thus be seen that with a suitable marking of the index plate the indicator will show directly the desired result regardless of the conditions under which the current is used in the three wire system.

As many changes could be made in the above construction and many apparently widely different embodiments of our invention designed without departing from the scope thereof, we intend that all matter contained in the above description shall be interpreted as illustrative merely of an operative embodiment of our invention and not in a limiting sense.

What we claim is:

1. In an electrical measuring instrument for three wire circuit, the combination of an indicator pivotally mounted to permit a swinging movement and a longitudinal movement thereof, a serrated member over which said indicator travels, the serrations of said member being formed to permit said indicator to travel thereover in one direction but to hold the same against a return movement, an operating member operatively engaging said indicator for movement in one direction only, means for moving said operating member in this direction, a thermally expansible wire operatively connected to said operating member, means for heating said wire by the current flowing in the outside lines of said three wire circuit, a coöperating thermally expansible wire, and means for heating said last named wire by the current flowing in the neutral line of said circuit.

2. In an electrical measuring instrument for three wire circuits, the combination of an indicator, an operating member operatively engaging said indicator for movement in one direction only, means for moving said operating member in this direction, a thermally expansible wire operatively connected to said operating member, means for heating said wire by the current flowing in the outside lines of said three wire circuit, a coöperating thermally expansible wire, and means for heating said last named wire by the current flowing in the neutral line of said circuit.

3. In an electrical measuring instrument for three wire circuits, the combination of an indicator, an operating member operatively engaging said indicator for movement in one direction only, means for moving said operating member in this direction, a pair of yielding supports, a pair of thermal members each extending from one of said supports to said operating member, means for heating said thermal members by the current flowing in the outside lines of said circuit, a compensating thermal member extending between said yielding supports, and means for heating said compensating member by the current flowing in the neutral lines of said circuit.

4. In an electrical measuring instrument adapted for use with a three wire circuit, the combination of a movable indicator, an operating member adapted to have operative connection with said indicator when moved in one direction only, means operative to move said member in this direction, a wire under tension heated and expanded by current passing through said circuit, said wire having connection with said operating member whereby the expansion of the wire allows said means to move said member, means for heating said wire from the current in said circuit, and a compensating wire operated by the current in the neutral line of said three-wire circuit.

5. In an electrical measuring instrument adapted for use with a three wire circuit, the combination of a movable indicator, a pivoted operating member adapted to have operative connection with said indicator when moved in one direction only, means operative to move said member in this direction, opposed spring supports, thermal wires stretched between said supports and said pivoted member at points on opposite sides of the pivotal axis thereof, whereby the expansion of the wires allows said means to move said member, means for heating said wires by the current to be measured, a compensating wire stretched between said compensating wire stretched between said spring supports, and means for operating said compensating wire by the current in the neutral line of said three-wire circuit.

Signed at New York, in the county of Kings and State of New York, this 27th day of March, 1908.

MAURICE J. WOHL.
HARRY HERTZBERG.

Witnesses:
JOHN H. FLATHMANN,
GEO. WELLING GIDDINGS.